United States Patent
Mazonas et al.

[11] Patent Number: 6,012,047
[45] Date of Patent: Jan. 4, 2000

[54] REVERSE MORTGAGE PROCESSING SYSTEM

[75] Inventors: Peter M. Mazonas, Larkspur; Robert F. Mattox, San Francisco, both of Calif.

[73] Assignee: Transamerica Corporation, San Francisco, Calif.

[21] Appl. No.: 08/561,444

[22] Filed: Nov. 21, 1995

Related U.S. Application Data

[63] Continuation-in-part of application No. 08/411,402, Mar. 28, 1995, abandoned, which is a continuation of application No. 08/008,762, Jan. 25, 1993, abandoned.

[51] Int. Cl.$^7$ ..................................................... G06F 17/60
[52] U.S. Cl. ............................................................. 705/38
[58] Field of Search ................................. 395/235, 236, 395/237, 238, 239; 705/35, 36, 37, 38, 39

[56] References Cited

U.S. PATENT DOCUMENTS

| | | |
|---|---|---|
| 4,346,442 | 8/1982 | Musmanno . |
| 4,376,978 | 3/1983 | Musmanno . |
| 4,597,046 | 6/1986 | Musmanno et al. . |
| 4,674,044 | 6/1987 | Kalmus et al. . |
| 4,700,297 | 10/1987 | Hagel, Sr. et al. . |
| 4,722,055 | 1/1988 | Roberts . |
| 4,750,121 | 6/1988 | Halley et al. . |
| 4,752,877 | 6/1988 | Roberts et al. . |
| 4,774,663 | 9/1988 | Musmanno et al. . |
| 4,797,818 | 1/1989 | Cotter . |
| 4,839,804 | 6/1989 | Roberts . |
| 4,969,094 | 11/1990 | Halley et al. ........................... 395/235 |
| 4,975,840 | 12/1990 | DeTore et al. . |
| 5,083,270 | 1/1992 | Gross et al. ............................ 395/235 |
| 5,132,899 | 7/1992 | Fox . |

(List continued on next page.)

OTHER PUBLICATIONS

"Realty World Corp. introduces ReaLoan, a computer-based mortgage network", PR Newswire, 1 page, Oct. 1984.

Les Gepay, "Piece of the Rock boosts Bellevue software firm", Seattle Post–Intelligencer, 1 page, Nov. 1987.

Philip B. Springer, "Home equity conversion plans as a source of retirement income", Social Security Bulletin, 9 pages, Sep. 1985.

Carol Ellison, "Amortizer Plus", PC Computing, 1 page, Jun. 1991.

"Elderly Homeowners Needing Cash to Live Can Take Advantage of Financing Options", Wall Street Journal, 1 page, Sep. 1984.

"Providential Clears Path But Rivals Won't Follow", Going Public the IPO Reporter, 2 pages, Feb. 1992.

Linda S. Klein & C.F. Sirmans, Financial Innovation and the Development of Reverse Mortgage Programs, Benefits Quarterly, 29–38, Mar. 31, 1993.

(List continued on next page.)

*Primary Examiner*—Emanuel Todd Voeltz
*Assistant Examiner*—Alexander Kalinowski
*Attorney, Agent, or Firm*—Hopgood, Calimafde, Kalil & Judlowe LLP

[57] ABSTRACT

A data processing system for selectively determining an appropriate balance of credit parameters associated with the issuance of Reverse Equity Mortgage financing. The system manages the risk associated with the credit by structuring a concurrent single premium deferred annuity to provide future cash flows starting at a system determined date corresponding to actuarially determined requirements of the borrower. The data processing system accepts inputs of the critical data required to perform the calculations and provides a detailed assessment of the proper level of credit and blend of annuity payments for the borrower, thereby solving the principal problem associated with RM products. Thereafter, the system provides the management for the plural current and past accounts associated with the client-based attributes for each lending opportunity.

20 Claims, 20 Drawing Sheets

OTHER PUBLICATIONS 5,182,770   1/1993   Medveczky et al. .
5,206,803   4/1993   Vitagliano et al. .
5,235,507   8/1993   Sackler et al. .
5,270,922   12/1993   Kalmus et al. .
5,297,032   3/1994   Trojan et al. .
5,490,243   2/1996   Millman et al. .
5,671,363   9/1997   Cristofich et al. .

OTHER PUBLICATIONS

Abby Schultz & Robert Clow, HomeFirst Set to Securitize Reverse Mortgage Loans: Possible Key to Growth for Cash–Hungry Industry, 15, Dec. 9, 1991.

Fund Allocation System, The Funds Management Group, Inc., 1986.

Blalock, Joseph, "Understanding Reverse Mortgages," *Savings & Community Banker,* Sep. 1994, V3N9, pp. 42–43.

FIG. 12

House Money System: Loan #0000020366, Ms. Dalke

File  Edit  Action  Manager  Administration  Window  Help

Payments | Loan File | Insurance | Taxes | Maturity
Borrower | Property | Status | Transaction | Terms Loan Status History Loan status is currently CLOSED. File retrnd, set on 03/24/94

| Date: | Changed to: | | Initials: |
|---|---|---|---|
| 03/24/94 | CLOSED | File retrnd | |
| 03/21/94 | SERV | Servicing | |
| 03/21/94 | CLOSED | Docs Recrd | |
| 03/20/94 | CLOSED | Intrst Start | |
| 03/19/94 | CLOSED | Disbursed | |
| 03/18/94 | CLOSED | Funded | |
| 03/17/94 | CLOSED | Docs Signed | |
| 03/15/94 | APPROVED | Clos Schd | |
| 03/14/94 | APPROVED | Docs-to-Title | |
| 03/12/94 | APPROVED | Docs Prep | |
| 03/03/94 | APPROVED | Loan Apprvd | |

Ready

FIG. 13

House Money System: Loan #0000020366, Ms. Dalke

File  Edit  Action  Manager  Administration  Window  Help

Payments | Loan File | Insurance | Taxes | Maturity
Borrower | Property | Status | Transaction | Terms

Loan Term Details

Product: Life time
Term Name: Start date of Annuity, Revision #0
Effective From: 3/25/94
Effective To:
    Value: 03/01/2006
Applicable:

Choose Terms
◉ All
○ ┌─ Term Group ─┐  ┌─ Term ─┐

Ready

REVERSE MORTGAGE PROCESSING SYSTEM

STATEMENT OF RELATED CASES

This application is a continuation-in-part of U.S. Ser. No. 08/411,402 filed Mar. 28, 1995 now abandoned, which is a continuation of Ser. No. 08/008,762, filed Jan. 25, 1993 now abandoned, the contents of which are incorporated by reference as if restated in full.

FIELD OF INVENTION

The present invention generally relates to systems for processing a plurality of individual accounts directed to mortgage analysis and management. More particularly, the present invention relates to a data processing system designed to evaluate select inputs corresponding to one of plural mortgage accounts, develop a profile of operating characteristics for originating a reverse equity mortgage instrument and managing a plurality of structured accounts in accordance with the specifics of the selectively established mortgage characteristics.

BACKGROUND OF THE INVENTION

The run-up in real estate value during the last ten years has created an unprecedented accumulation of wealth in the physical assets of many persons. The story of the blue collar worker suddenly finding himself in a house worth many times the purchase price is commonplace. Indeed, as our general population ages, a significant portion of the population is finding that most of their accumulated wealth is tied up with their home.

It is, of course, mostly fortuitous that the aging generation in the United States has such wealth, as a minimum acting as an inflation hedge against both the erosion of their purchasing power from fixed income, and the declining real return from other assets. This benefit comes with concomitant stresses and choices, especially to elderly homeowners. More particularly, inflation-diminished pensions in many instances simply do not provide enough to cover basic living expenses for those of retirement age. Although these homeowners are rich "on paper" their relatively minimal cash flow acts to impoverish them. Given their asset base in the house, these homeowners are left with a difficult choice regarding funding future needs, especially in view of concurrent strong desires to remain in their present homes.

The increasing incidence of the foregoing circumstances has led to the development of a new form of mortgage debt. During the last several years, the financial community has begun to offer credit to homeowners based on the equity in the house. This form of this credit goes beyond the traditional second mortgages or home equity loans because repayment is not due until the house is sold. In fact, the loan is structured as a stream of cashflows for a period of time corresponding to the level of equity in the house and the age of the borrower. In this way, homeowners enjoy living in their homes during the loan period while concurrently receiving periodic payments to cover living expenses. This form of financing is known as a reverse mortgage or "RM", and is now growing in popularity among those with the majority of their assets in valuable real estate.

The RM product is without a doubt an important and valuable advance in financing. Notwithstanding its current growth and popularity, RM's include attributes and characteristics that do not satisfy the needs of many possible users. Moreover, the implementation of RM's is difficult as the value of the equity in a home is subject to the vagaries of the marketplace. If not properly structured, the issuing creditor will end up with segments of the loan lacking proper collateralization.

OBJECTS AND SUMMARY OF THE INVENTION

It is, therefore, an object of the present invention to provide a data processing system that manages the servicing of a plurality of asset-backed RM loans.

It is also an object of the present invention to provide systems for managing separate cash flow accounts that couple the features of a reverse mortgage instrument with the features of a single premium deferred annuity to insure continued cash flow on an actuarial basis.

It is another object of the present invention to provide a system for evaluating individual applications for RM financing and selectively determining the proper level and sequence of financial terms associated with a RM product.

It is still another object of the present invention to provide a shared appreciation RM product implemented and tracked on a data processing system.

The above and other objects of the present invention are realized in an illustrative RM account data processing system. The subject invention includes a database memory for storing a plurality of individual accounts. A separate processor provides for loan servicing and general account management. The accounts represent loans provided to borrowers which are delivered in periodic payments in accordance with stored loan parameters. Individual accounts are stored in memory and routinely updated by the system manager. The loan accounts are further coupled to a single premium deferred annuity of pre-selected characteristics conforming to the risk reduction attributes defined by the individual account needs at the time of origination. The management of the account is accomplished by the programmed controlled data processor.

In accordance with the varying features of the present invention, the loan is typically repaid from the proceeds that accrue from the sale of the asset used to secure the loan (such as the house). The repayment event date is variable and usually contingent on the borrower's sale or move out of the property, or on the death of the borrower. To reduce the risk associated with the variable end of the loan term, the system implements a single premium deferred annuity to provide future cash flow at a predetermined point prior to loan asset exhaustion. Implementation of the above attributes on a large scale requires a specifically structured data processing system that is configured to manage the multiple accounts in accordance with the characteristics of each account.

The foregoing features are more fully appreciated taken in conjunction with the following description of a specific illustrative example thereof including the following drawings.

BRIEF DESCRIPTION OF THE FIGURES

Figure 13:
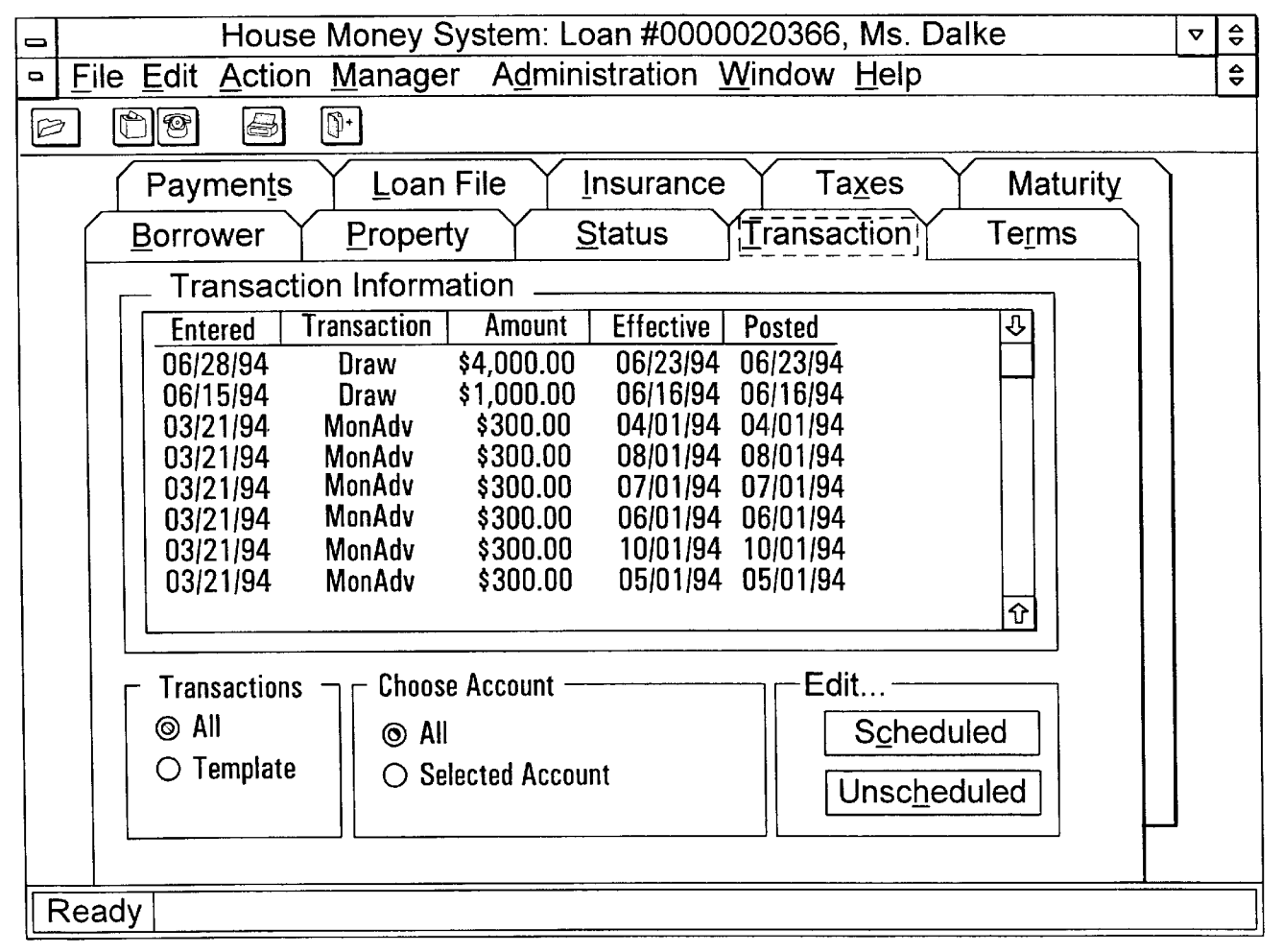
Figure 15:
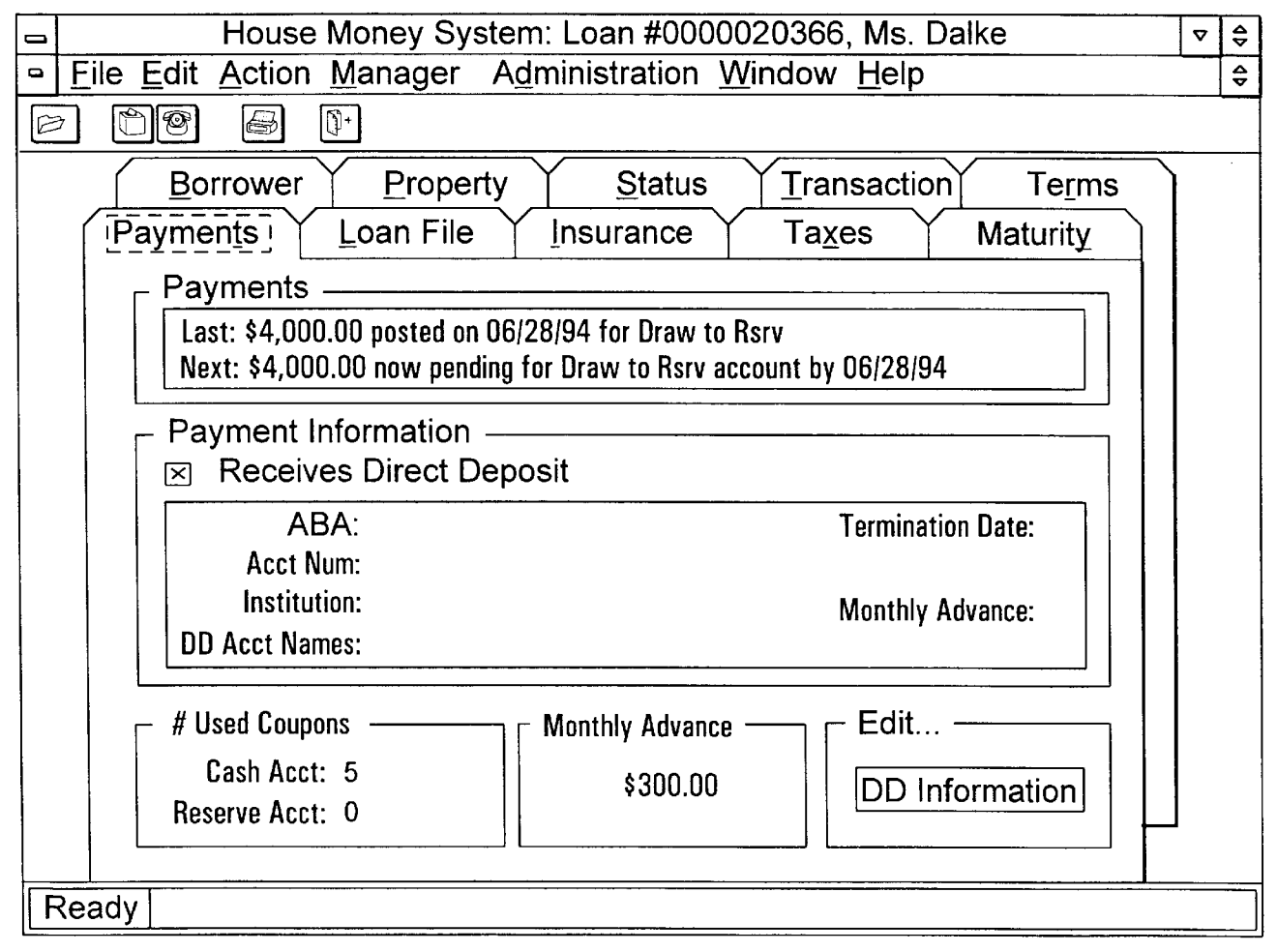
Figure 17:
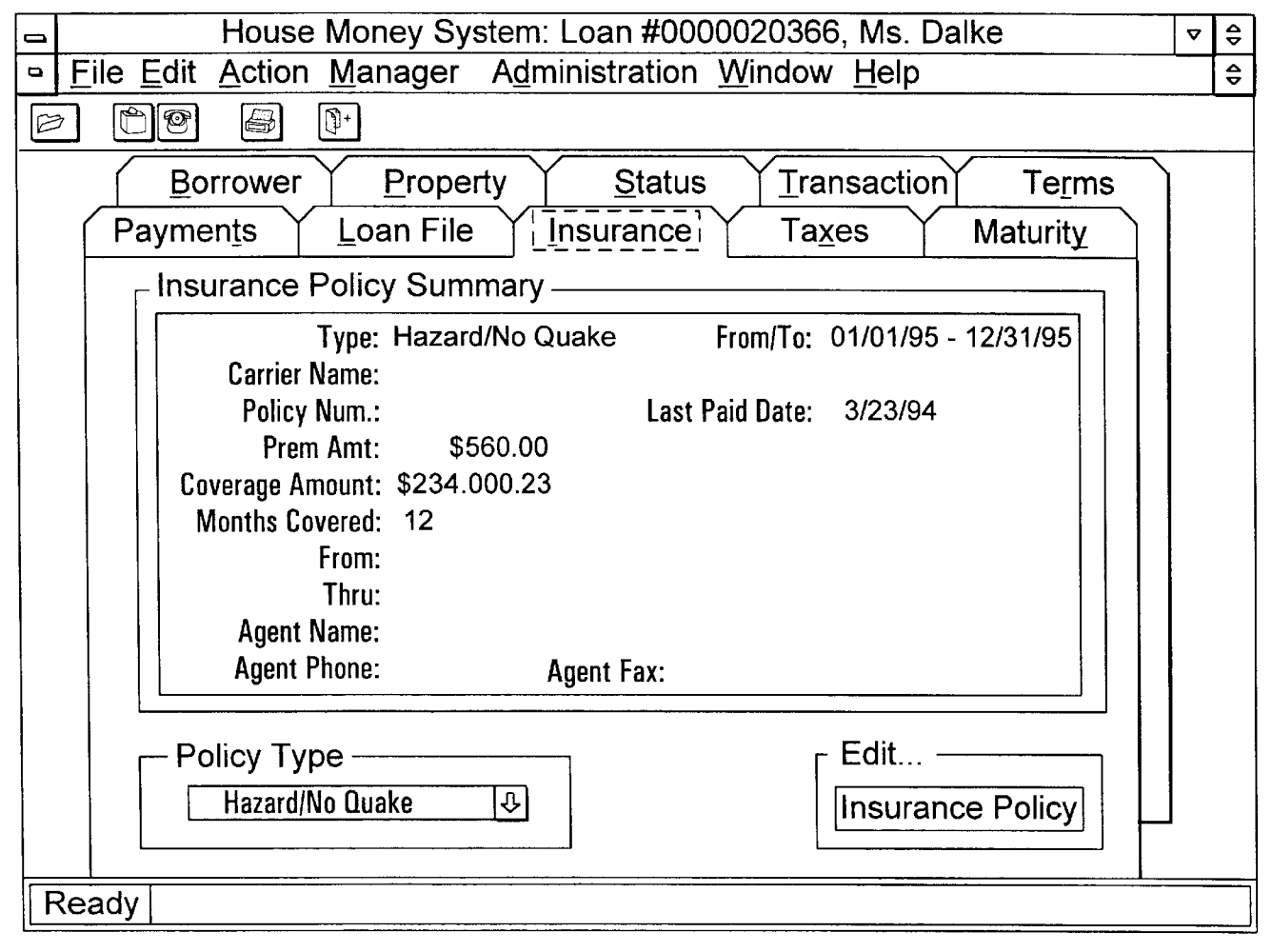
Figure 18:
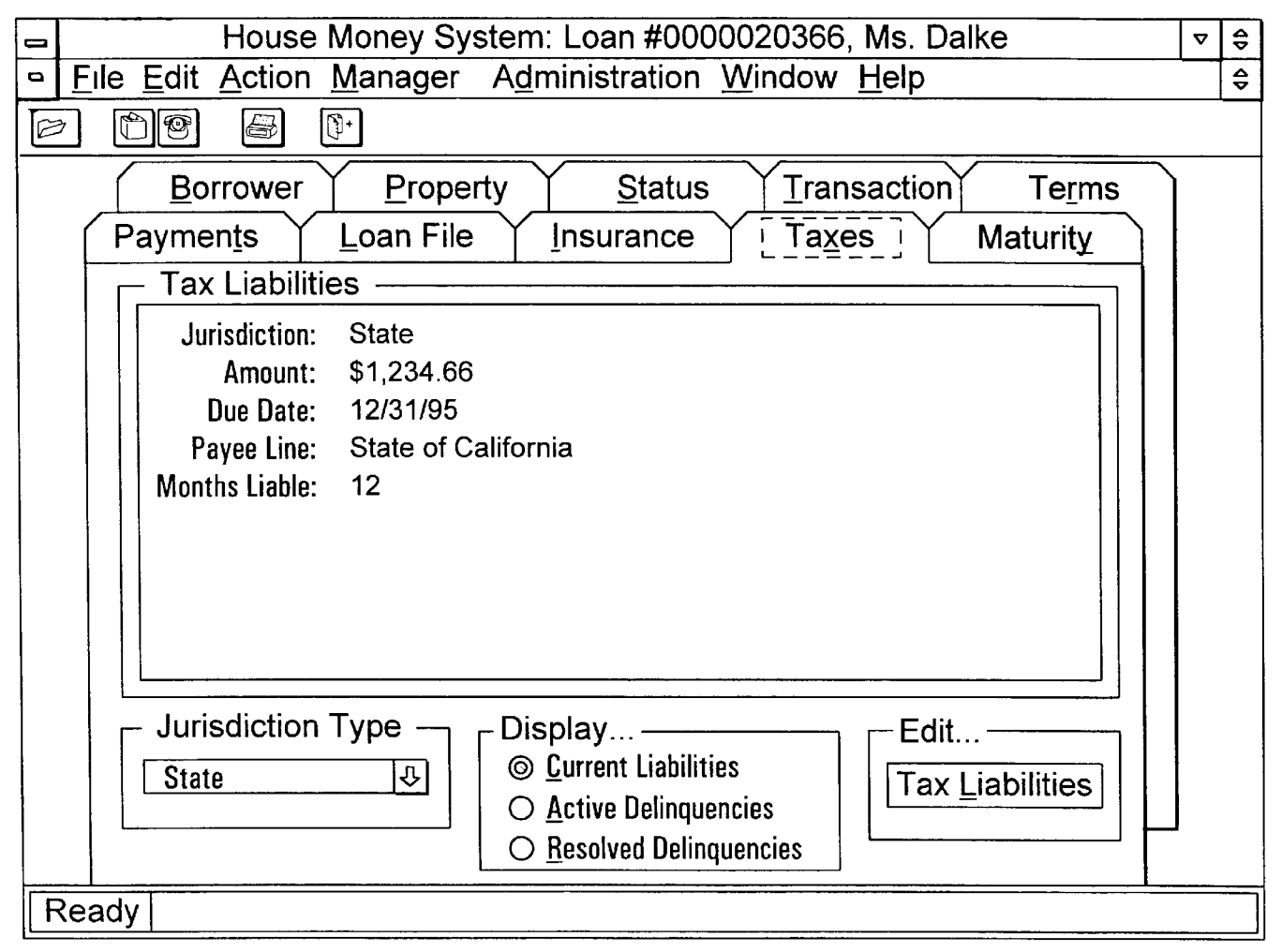
Figure 19:
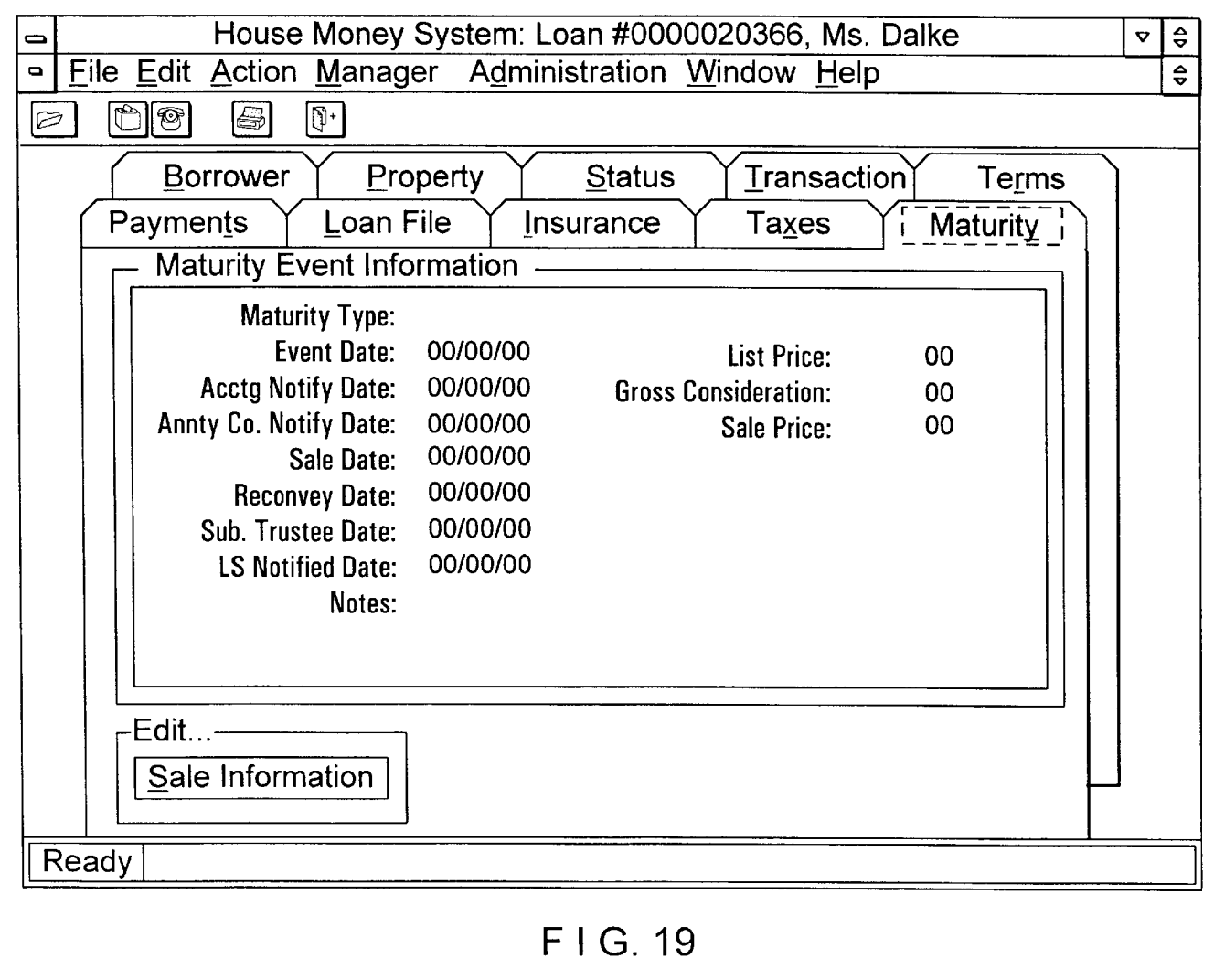

FIGS. 10–19 screen displays associated with loan management and servicing.

DETAILED DESCRIPTION OF THE INVENTION

First describing the present invention in overview, the data processor is directed to two discrete functions for implementing the above described financial system. The first function of the present invention involves the determination of an optimal mix of loan and deferred annuity appropriate for reducing risk to the lender. In essence, the property securing the loan is evaluated for present and future worth. The age of the borrower is used to make an actuarial assessment of future cash flow which can be provided for the rest of his/her life. A balance is then struck between the diminishing equity in the house and the potential future need of income due to survival beyond the depletion date of this equity, and based thereon, a set of loan parameters is calculated as the optimal configuration for the extension of credit to the borrower.

Once the loan attributes are established and the loan is closed, a loan servicing module controls the day to day management of servicing the loan—including, by way of example, the payment of fixed or variable periodic payments, scheduling periodic visits to the property, sending periodic accounting statements, ensuring proper collection of property taxes and other periodic events and the monitoring of the loan throughout its life. This is undertaken for multiple accounts—each having a distinct profile requiring individual and borrower specific processing.

Figure 1:
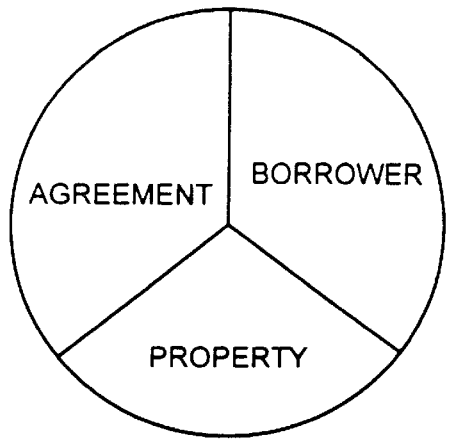
FIG. 1 depicts the tri-part relationship associated with system management.

With the foregoing overview in mind attention is now directed to a specifically delineated example of the present invention. To provide a more complete understanding of the invention, FIG. 1 is used to indicate the distinct yet contiguous information that is processed and managed by the system data processor. Specifically, FIG. 1 provides a simple pie chart divided into three fundamental areas—the agreement, the borrower and the property. The data processor—as a primary matter—focuses on managing information that falls into one or more of these three areas.

Figure 3:
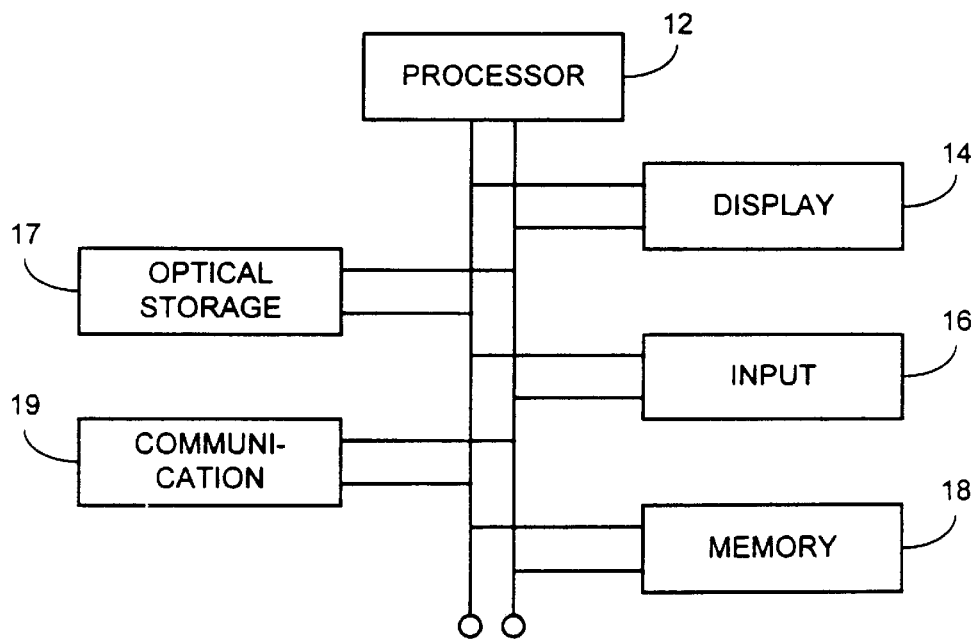
FIG. 3 depicts in functional block form the hardware associated with the present invention.
Figure 2:
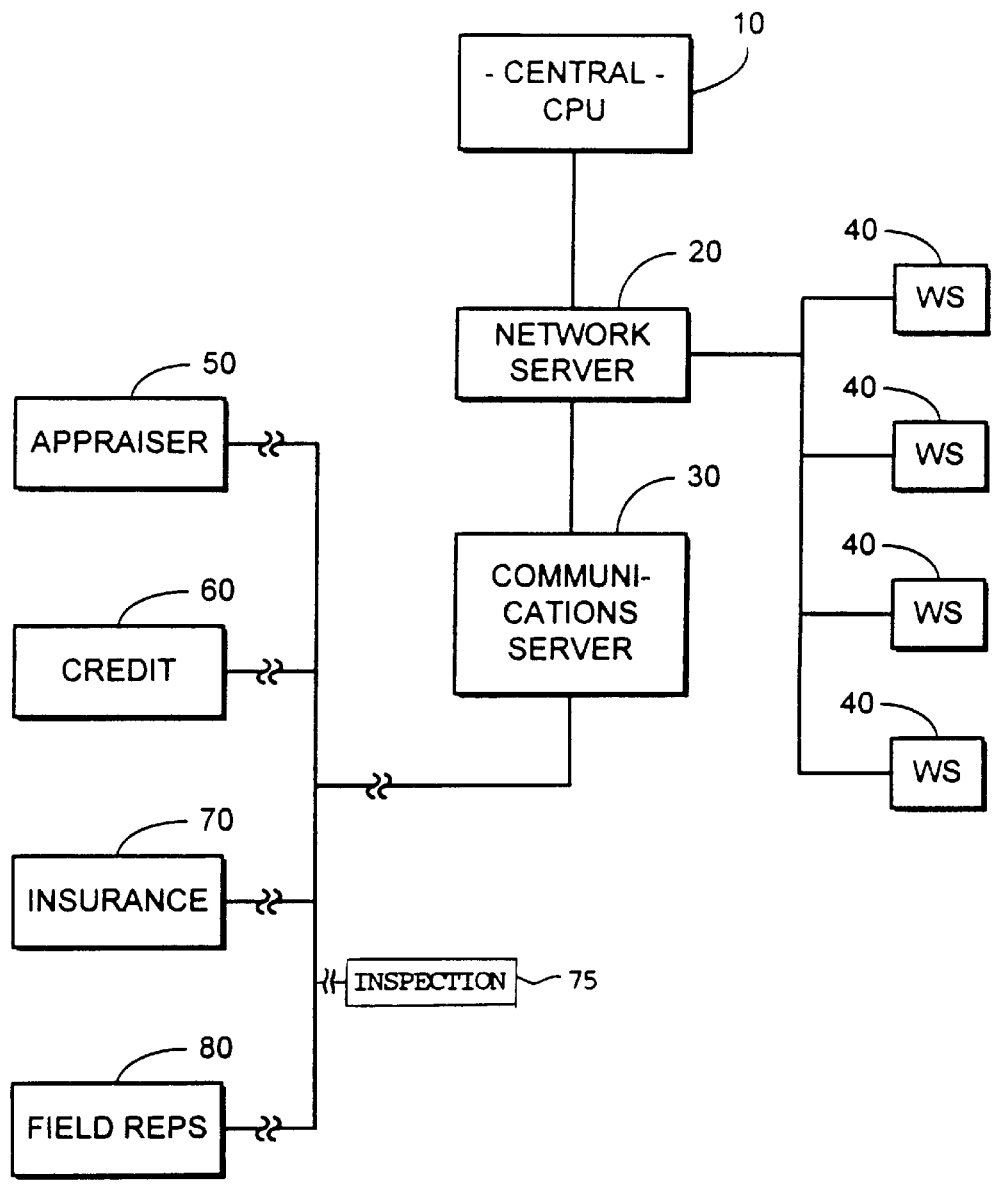
FIG. 2 depicts the interrelated hardware platforms associated with the present invention.

Turning now to FIG. 2, a block diagram is used to depict the type of hardware and the associated interconnections there-between that may be used to implement the present invention. The central database is managed by CPU 10 which is either a PC or UNIX based workstation that is discussed in more detail with reference to FIG. 3. The CPU is linked to Network Server 20 and Communication Server 30. These two servers are shown as distinct units to highlight their individual function. It is possible that both server functions will be undertaken by CPU 10 without departing from the system design.

Continuing with FIG. 2, Network Server 20 provides separate links to one or more individual and discrete work stations (WS) 40. These work stations provide for multiple access ports to the database for loan input, creation and servicing by the loan administrators. As will be more clear from the following discussion, the implementation of the RM requires a plethora of outside support—uniquely contributed by remote entities—but completed in a manner consistent with the timing requirements of the system. Accordingly, CPU 10 is linked via Server 30 to a plurality of outside vendors responsible for Appraisals 50, Inspection 75, Credit 60 and Insurance 70. The above link provides for rapid submission of ascertained data to the CPU on individual RM applications.

Alternatively, this information may be transmitted by conventional phone communications to be locally inputted into CPU 10. Finally, the system provides for remotely located representatives 80 to facilitate the application process—the results of which may be downloaded to the local CPU via the link therebetween. As will be described more completely below, the reps 80 will be equipped with small laptop PCs individually programmed with the Pricing Module—and thus individually capable of establishing the matrix of loan parameters on an individual basis.

As discussed above, the specific requirements of CPU 10 will depend in large measure on the scope and complexity of the programs offered and the number of participating applicants and ultimately—borrowers. This is delineated in block diagram form in FIG. 3. At the nascent stage of operation, much processing functionality can be accomplished on a system with a single processor 12, with monitor 14, keyboard or mouse input 16 and hard disk memory 18—utilizing a simple PC database program such as Excel. As system demands increase, the associated hardware may include optical storage 17 and separate communications port 19. As the demands increase with large numbers of applicants and current loans, the PC unit may be replaced preferably with a CPU utilizing UNIX operating system, a Sybase database and a number of individually programmed interfaces using PowerBuilder to support the separate applications. One aspect of the present invention involves the qualification of applicants during the pre-application process. In particular, recognizing that the number of individually owned homes is in the tens of millions and only a very small fraction of that total would have need for an RM, the system provides a series of screening operations—to size the universe of applicants to a manageable amount.

Figure 4A:
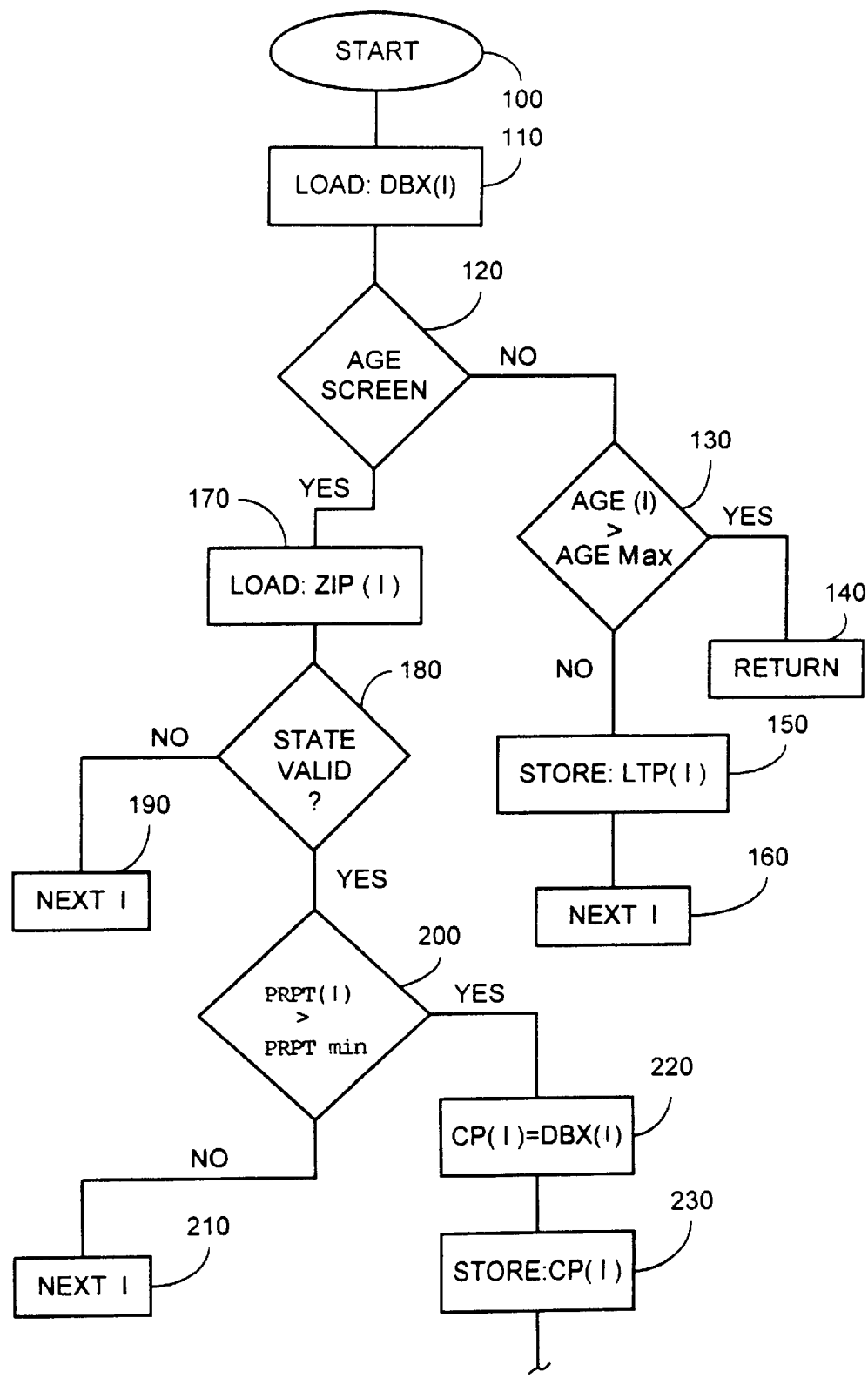
FIGS. 4A and 4B provide a flow chart of the logic for prospect screening subsystem.

Part of this process is delineated in flow chart form in FIG. 4A. Beginning with start block 100, an initial database of potential applicants DBX (I) is loaded into system memory. On an incremental basis, each member (utilizing the Ith counter) of the database is tested as to age—test 120; a negative response branches logic to test 130 wherein the applicant age (I) is compared to a pre-stored minimum age; applicants not old enough (no response) pass to block 150 and are stored in a "future" database in age order; logic continues at block 160 returning to the next Ith applicant. A positive response to test 130 provides for continuation of the processing to the next screen—set forth as the affirmative (yes) response to test 120.

Continuing with FIG. 4, at block 170 the system loads the zip code for the Ith applicant and determines the state code associated with the zip code. This state code is then compared to the list of approved states stored in the database—if the code does not match a valid state (no to test 170), logic branches to block 190 and the candidate is discarded with processing continuing to the next candidate (I+1); however a positive response to test 170 passes logic to the final test in this series—a screen based on the perceived value of the property. Again this is accomplished by a comparison of the Ith property value PRPT (I) to a minimum value PRPT min. Values in excess of the minimum (yes to test 200) are stored in the final abridged database CP (I) via blocks 220 and 230 in sequence. Properties failing to meet the minimum value are dropped via block 210.

The foregoing screening procedures may be augmented by outside applications that further qualify prospects. In particular, local property values may be accessed via systems such as MetroScan—a service that calculates an estimated appraisal for a selected property, i.e., the prospect, based on a numerical assessment of the recent sales data for property transactions in the same geographical area. These determinations are refined by the selected variables of house type, age, etc. resulting in a fairly good first estimate without an actual personal visit by a professional appraiser.

Figure 4B:
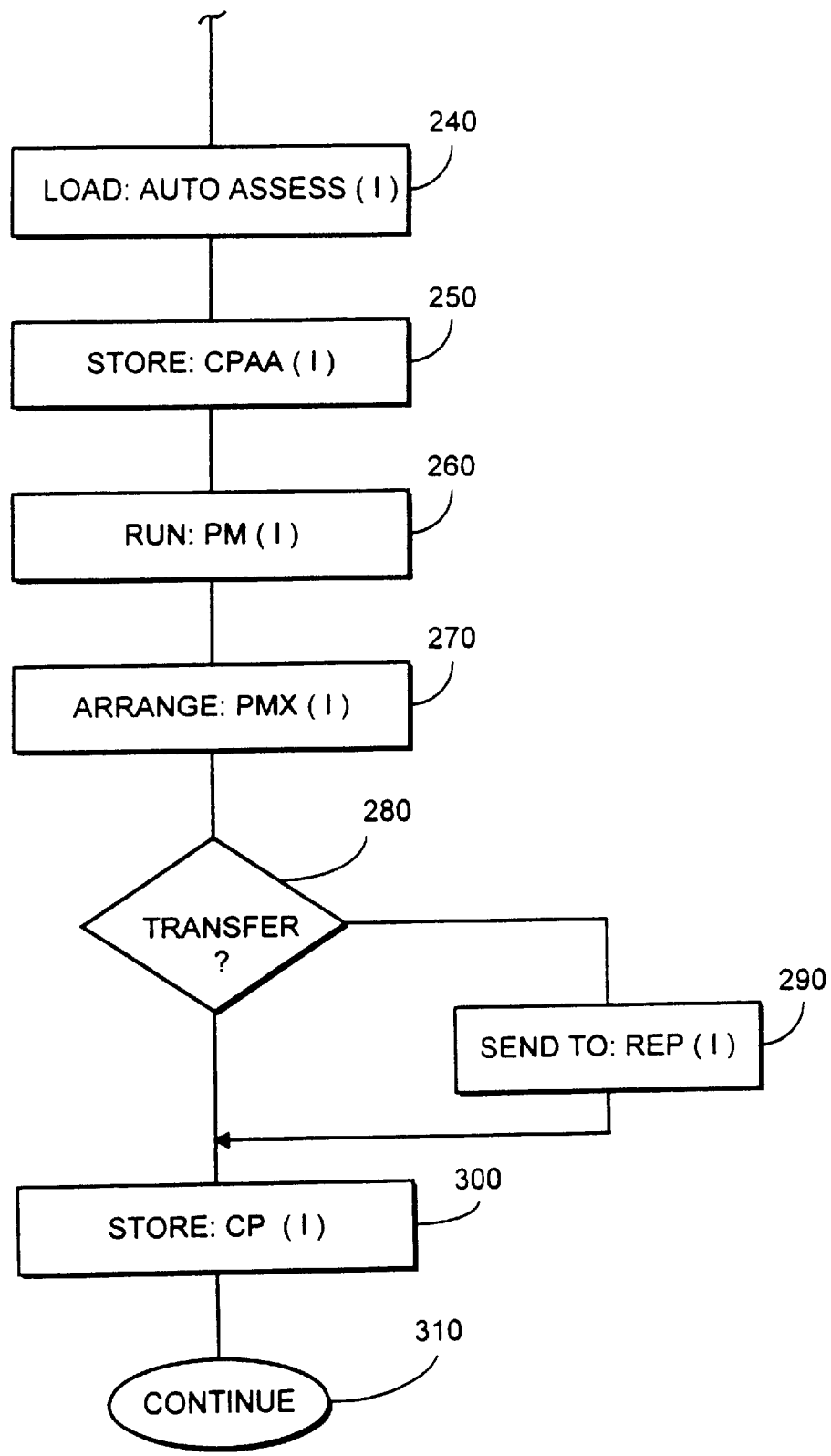

In addition, this can be linked to the prospecting process of FIG. 4B—utilizing the AutoAssess application loaded via block 240. The resulting property and prospects CPAA (I) are stored in a separate file. Finally, the prospects are entered for a preliminary run through the Pricing Module (the operation of which will be described in detail below) block 260 and the PM (I) data selectively arranged by prospect rank, block 270. The file is thus complete and available for transfer to one or more local reps, test 280 and block 290—but stored in any event at block 300.

To better understand the parameters important in the prospect and application process, Table I below provides the type of information that is collected during the application process. The application information is collected and stored in the system database—a process that is accomplished in the field using laptop computers with the resulting biographic data transmitted via modem to the central computer or manually via facsimile or similar means and then key stroked into the system.

TABLE I

APPLICATION NO.: _____

TRANSAMERICA
HOMEFIRST
APPLICATION FOR [] INDIVIDUAL CREDIT  [] JOINT CREDIT  NOTICE: IF YOU ARE MARRIED, YOU MAY APPLY FOR CREDIT IN YOUR OWN NAME

| TYPE OF LOAN | | | | | | *ANNUITY |
|---|---|---|---|---|---|---|
| [ ] LIFETIME* | | [ ] PREMIUM* | | [ ] TERM: ___ yrs. | [ ] OTHER | [] Provider 1 |
| [] Fixed Rate Reserve Account | | [] Fixed Rate Reserve Account | | | | |
| [] Adjustable Rate Reserve Account | | [] Adjustable Rate Reserve Account | [ ] CASH ACCOUNT | | | [] Provider 2 |

| APPLICANT - LAST NAME | FIRST NAME | M.I. | [ ] MR. [ ] MRS. | SOCIAL SECURITY NO. | AGE | DATE OF BIRTH | [ ] UNMARRIED [ ] MARRIED [ ] SEPARATED |
|---|---|---|---|---|---|---|---|
| JOINT APPLICANT - LAST NAME | FIRST NAME | M.I. | [ ] MR. [ ] MRS. | SOCIAL SECURITY NO. | AGE | DATE OF BIRTH | [ ] UNMARRIED [ ] MARRIED [ ] SEPARATED |
| APPLICANT'S PHOTO I.D. | DOB VERIFIED WITH | CITIZENSHIP | | JOINT APP'S PHOTO I.D. | DOB VERIFIED WITH | | CITIZENSHIP |

| STREET ADDRESS | | CITY | | STATE | ZIP CODE | COUNTY | TELEPHONE |
|---|---|---|---|---|---|---|---|
| MORTGAGE HOLDER, IF ANY | ACCOUNT NUMBER | | PAYMENT | BALANCE | | ASSESSOR'S PARCEL NO., IF KNOWN | |
| DWELLING INS. CARRIER | AGENT | POLICY NUMBER | | TELEPHONE ( ) | | YEAR PURCHASED | PROPERTY [ ] YES IN TRUST? [ ] NO |
| NEAREST RELATIVE | | RELATIONSHIP | | TELEPHONE ( ) | | ESTIMATED VALUE | ANNUAL RE. TAXES |
| STREET ADDRESS | | CITY | | STATE | ZIP CODE | SFR [] PUD [] CONDO [] | PLEX [] |

| NET MONTHLY INCOME | AMOUNT $ | CONFIRMATION SOURCE | THE INITIALS | MONTHLY LIVING AND HOUSING RELATED EXPENSES | AMOUNT $ |
|---|---|---|---|---|---|
| EMPLOYMENT WITH | | | | ANNUAL REAL ESTATE TAXES ÷ 12 | |
| | | | | ANNUAL DWELLING INSURANCE ÷ 12 | |
| PENSION FROM | | | | ANNUAL AUTO INSURANCE ÷ 12 | |
| | | | | UTILITIES (ELECT., GAS, WATER, ETC.) | |
| SOCIAL SECURITY | | | | ASSOC. DUES, ASSESSMENTS, ETC. | |
| | | | | MAINTENANCE, GARDENER, ETC. | |
| DIVIDENDS/INTEREST | | | | FOOD AND OTHER NECESSITIES | |
| | | | | CLOTHING | |
| IRA, KEOUGH | | | | ENTERTAINMENT | |
| | | | | AUTO MAINTENANCE, GAS, ETC. | |
| OTHER (Alimony, child support or separate maintenance income need not be revealed if the APP does not choose to have it considered as a basis for repaying this loan.) | | | | OTHER | |
| | | | | MISCELLANEOUS (15% OF NET INCOME) | |
| | | | | TOTAL LIVING AND HOUSING | |
| | | | | SUMMARY | AMOUNT $ |
| ESTIMATED TRANSAMERICA HOMEFIRST PAYMENT | | Reserve Account $ | | | |
| TOTAL MONTHLY INCOME | | | | TOTAL MONTHLY INCOME | |
| MONTHLY MEDICAL EXPENSE | AMOUNT $ | Lump Sum Requested $ | | | |
| MEDICARE SUPPLEMENT | | | | | |
| OTHER HEALTH INSURANCE | | | | TOTAL LIVING AND HOUSING | |
| MEDICAL AND DENTAL PAYMENTS | | Do you anticipate any substantial change in your overall financial situation or income | | | |
| PRESCRIPTIONS | | | | | |
| OTHER | | | | TOTAL MEDICAL | |
| TOTAL MEDICAL | | | | | |
| LIST OTHER MONTHLY INSTALLMENTS (VISA, MC, CAR PAYMENT, ETC.) | | [ ] YES  [ ] NO If yes, explain- | | TOTAL INSTALLMENT | |
| TOTAL BALANCES | TOTAL PMTS | | | | |
| | | | | SURPLUS (CIRCLE IF NEGATIVE) | |

Agreement: [enter desired agreement]

Certification: I/We certify the information provided in this application is for the purpose of obtain this loan and is true and correct as of the date set forth opposite my/our signature(s) on this application.

_____  _____   _____  _____
Applicant Signature  Dated    Joint Applicant Signature  Dated The inventive system includes a predictive price model engine for determining a select mix of loan variables optimally configured to the applicant's particular needs. This process is delineated in the next sequence of flow charts—shown in hierarchial fashion for illustrative purposes. The system utilizes indexed variables to manage the plurality of accounts and to interface with the loan servicing subsystems. The variables often employ cryptic nomenclature and therefore the following table is provided as a guide through the diagrams.

TABLE 2

Figure 8:
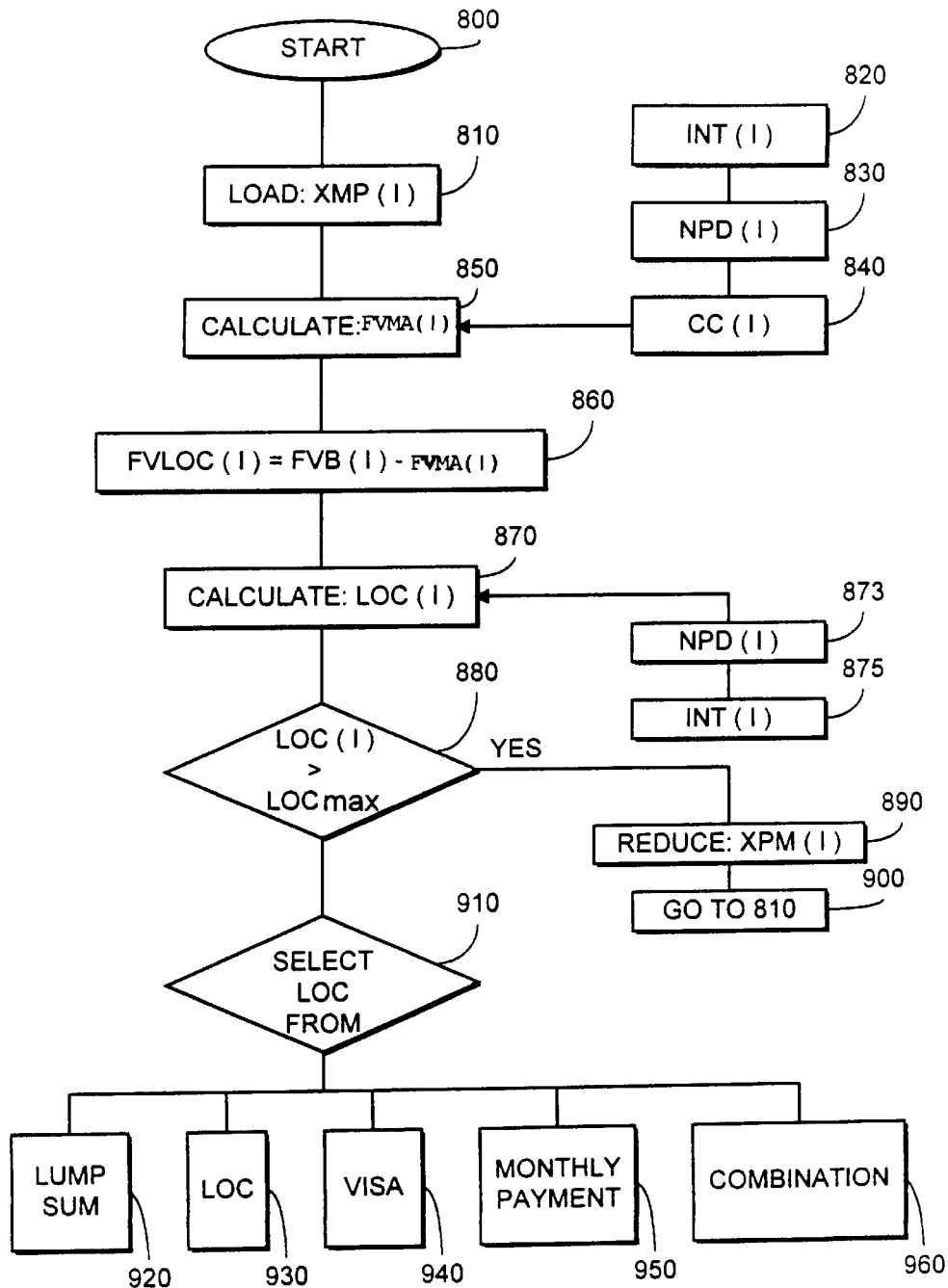
FIG. 8 provides a flow chart of the line of credit subsystem.

| Variables | |
|---|---|
| App(I) = | Appraisal value ($) for Ith application |
| Elec(I) = | Elective reserve for Ith application |
| OHV(I) = | Origination home value |
| FVB(I) = | Future value of base amount |
| FV(I) = | Future value of closing costs |
| NPD(I) = | Number of periods until deferred annuity for Ith application |
| MP(I) = | Monthly payment for Ith application |
| BA(I) = | Borrowers age for Ith application |
| PP = | Period (e.g., one month) |
| LDS(I) = | Loan date - Start |
| DSD(I) = | Deferral start date |
| CC(I) = | Loan closing costs |
| LSM(I) = | Loan - lump sum |
| LLN(I) = | Liens on Ith property |
| LOC(I) = | Line of credit - see, FIG. 8 |
| HRR(I) = | Home repair reserve (Ith) |
| LOF(I) = | Loan originator fees |
| RecF(I) = | Recordation fees |
| TTL(I) = | Title Insurance Costs |
| FVMA(I) = | Future value of mortgage amt. |

Figure 5A:
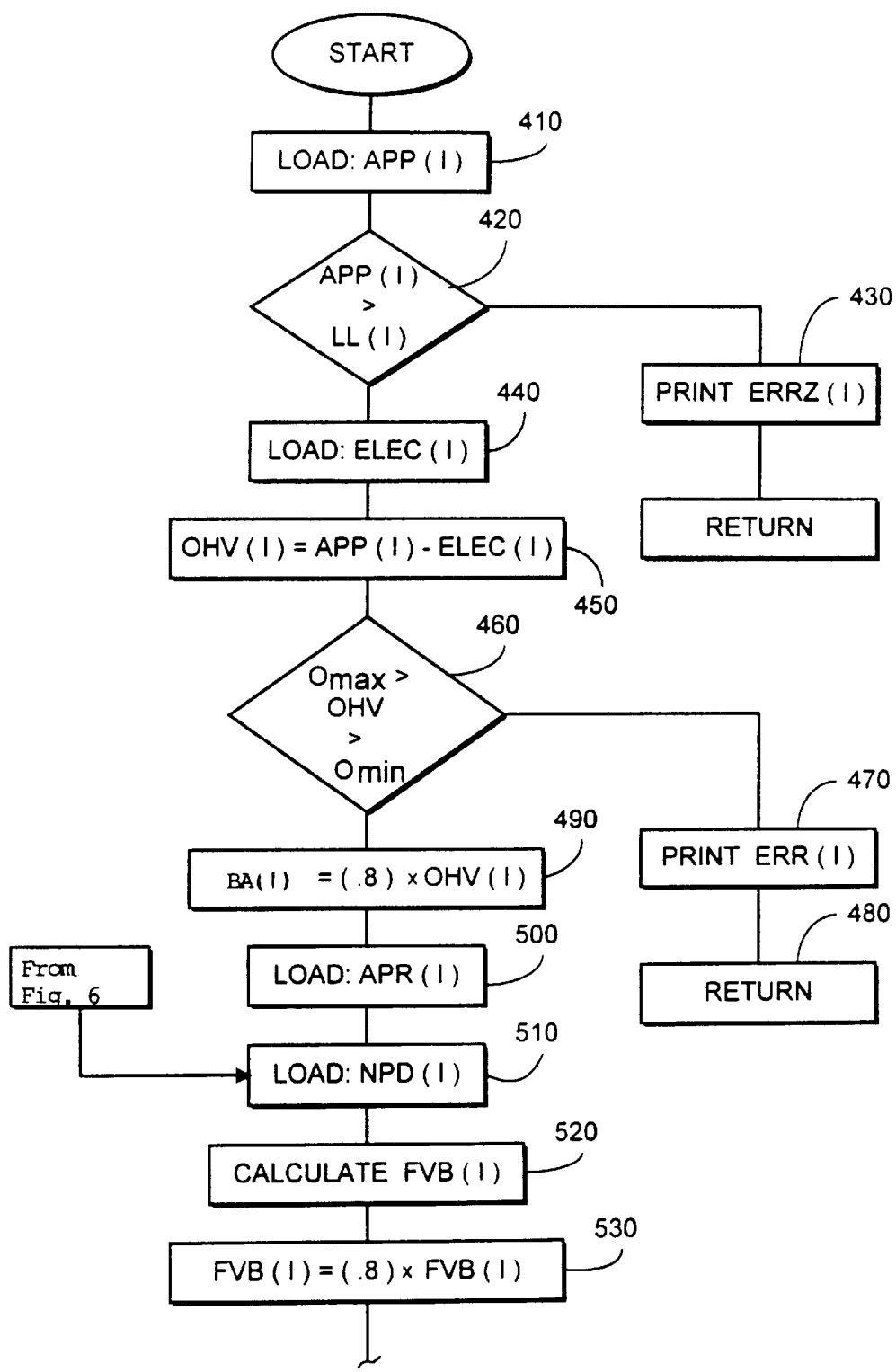
FIGS. 5A and 5B provide a flow chart of the pricing model.

Specifically and turning attention to FIG. 5A, the first step in determining the optimal mix for the borrower is to determine the Appraised Value for the borrower's property which is loaded APP (I)—the Ith application—into the system at block 410. If the property value is less than the pre-established lower limit, test 420, a message is printed that the property is not appropriate for a reverse mortgage at block 430. If the property value is over the lower limit (LL (I)), the property may be suitable for a reverse mortgage and logic continues to block 440 and the applicant's elective reserve (an amount selected by the borrower to be excluded from loan considerations) is entered into the system as a variable: Elec (I). This borrower's elected reserve amount, called Borrower's Elective Reserve, is protected in all but the case in which the home is destroyed and not rebuilt.

As depicted in block 450, the Borrower's Elected Reserve is then subtracted from the Appraised Value, the result of which is called the Origination Home Value (OHV (I)). If the origination Home Value is greater than the pre-established upper limit or less than the pre-established lower limit (Omin)—determined at test 460—a message is printed that the property is not appropriate for a reverse mortgage, block 470. If the Origination Home Value is within the above stated limits, then the Origination Home Value is multiplied by 0.8 and used as the full Origination Home Value for subsequent processing, block 490. This is also the value referred to as the Base Amount from which the monthly payment is determined (see below).

The system next determines the future value of the base amount FVB (I)—a process that requires two additional factors besides the Base Amount. The first is the Appreciation Rate which is the rate determined by the lender and loaded at block 500 (APR (I)). This rate may change with the calculation of each loan or geographic area, or may be held constant for all loans in a given portfolio.

Figure 5B:
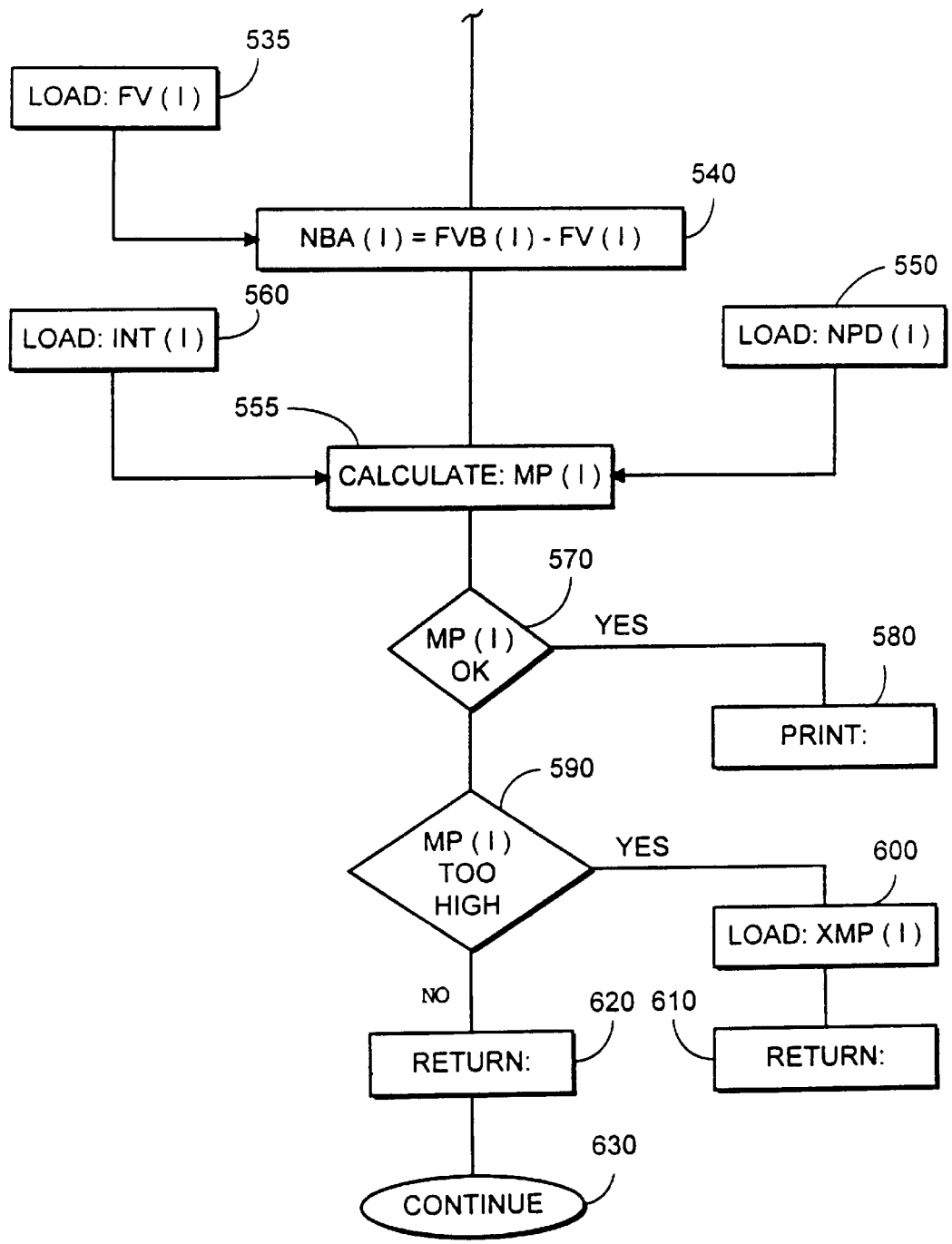

The second factor is the Number of Periods Until the Deferred Annuity Payments Begin (NPD (I))—this value is determined in the manner described below in reference to FIG. 6 and is shown as input via block 505 to this process stream. Based thereon the system calculates the future value of the base amount FVB (I) at block 510 using well known discounted cash flow techniques. This amount is then reduced by 20 percent via block 520 to ascertain the lendable amount. Processing is then linked to block 530 and the future value of the closing costs is loaded from FIG. 6 and the net base amount NBA (I) is calculated at block 540 (FIG. 5B); given the applicant's prior choices of Elected Reserve Equity (Elec (I)) and Line of Credit options—see below—the system can calculate the reverse mortgage monthly payments using as variables: 1) the Net Base Amount; 2) the Interest Rate; and 3) the Number of Periods until the Deferred Annuity Payments Begin. This calculation is depicted at block 555.

Once the Monthly Payment is determined (MP (I)), this information is provided to the applicant to determine acceptability, test 570. If the answer is yes, a report is printed with the specifics of the loan (I); If the MP (I) is too high, the applicant is requested to select a smaller amount, XMP (I)—block 600, at which point the system will return to the calculation of the line of credit function and recompute the monthly payment based on a higher line of credit amount available able which it will also recompute, block 610. If the amount is too low, "NO" to test 590, the system loops back, block 620 and selects a new deferral period for each of the three years on either side of the deferral period used in the current calculation. The system then recomputes seven new monthly payment amounts and puts each of these payments and annuity costs associated with each payment into a Table. The Table is then used, along with the Number of Periods Until the Deferral Start Date Begins and the Interest Rate to calculate the Net Present Value of each of the seven alternatives. The system then selects the choice with the highest net present value amount which is the optimized monthly payment for the borrower.

Figure 6:
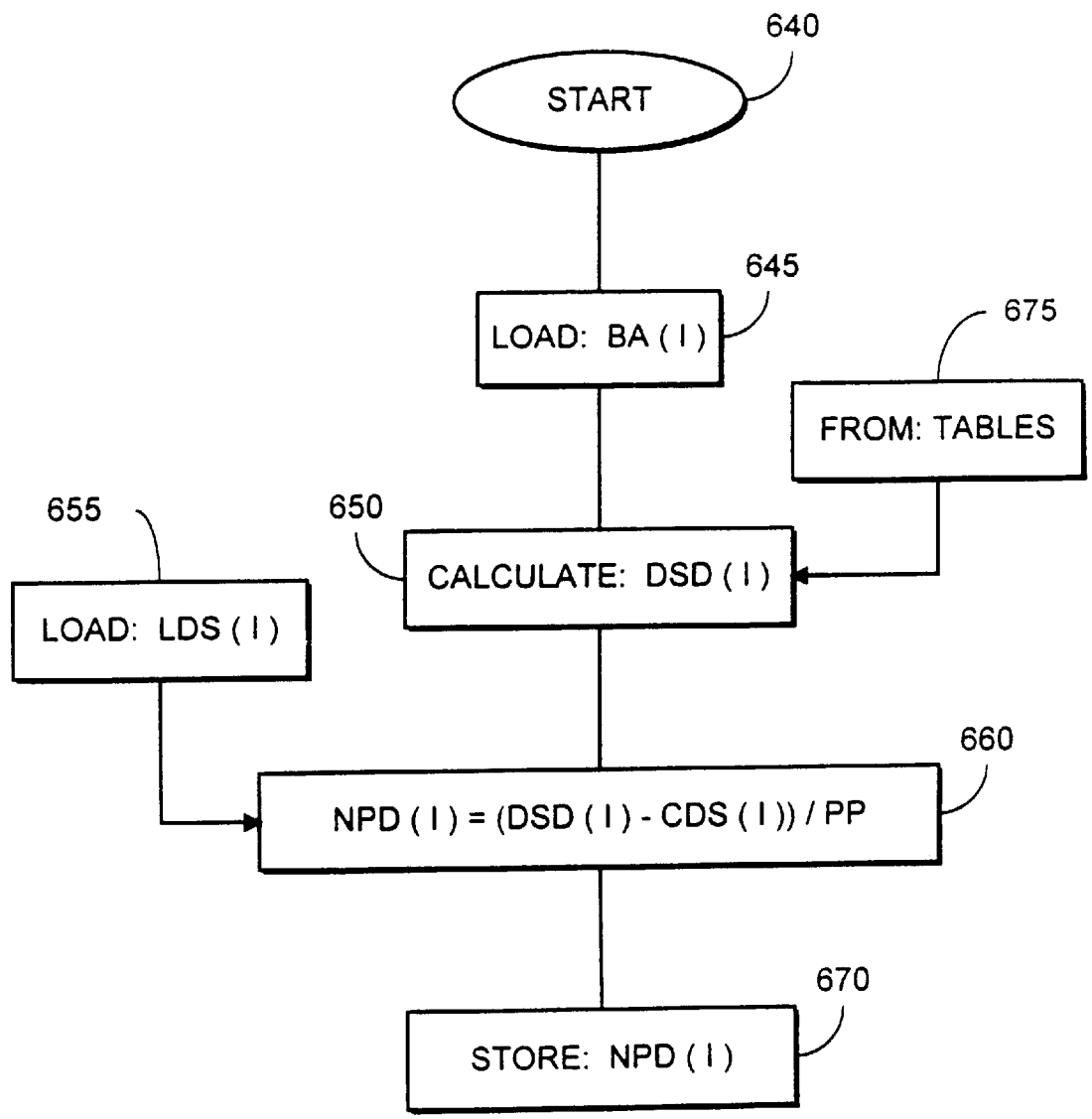
FIG. 6 provides a supplemental flow chart for the deferral subsystem.
Figure 7:
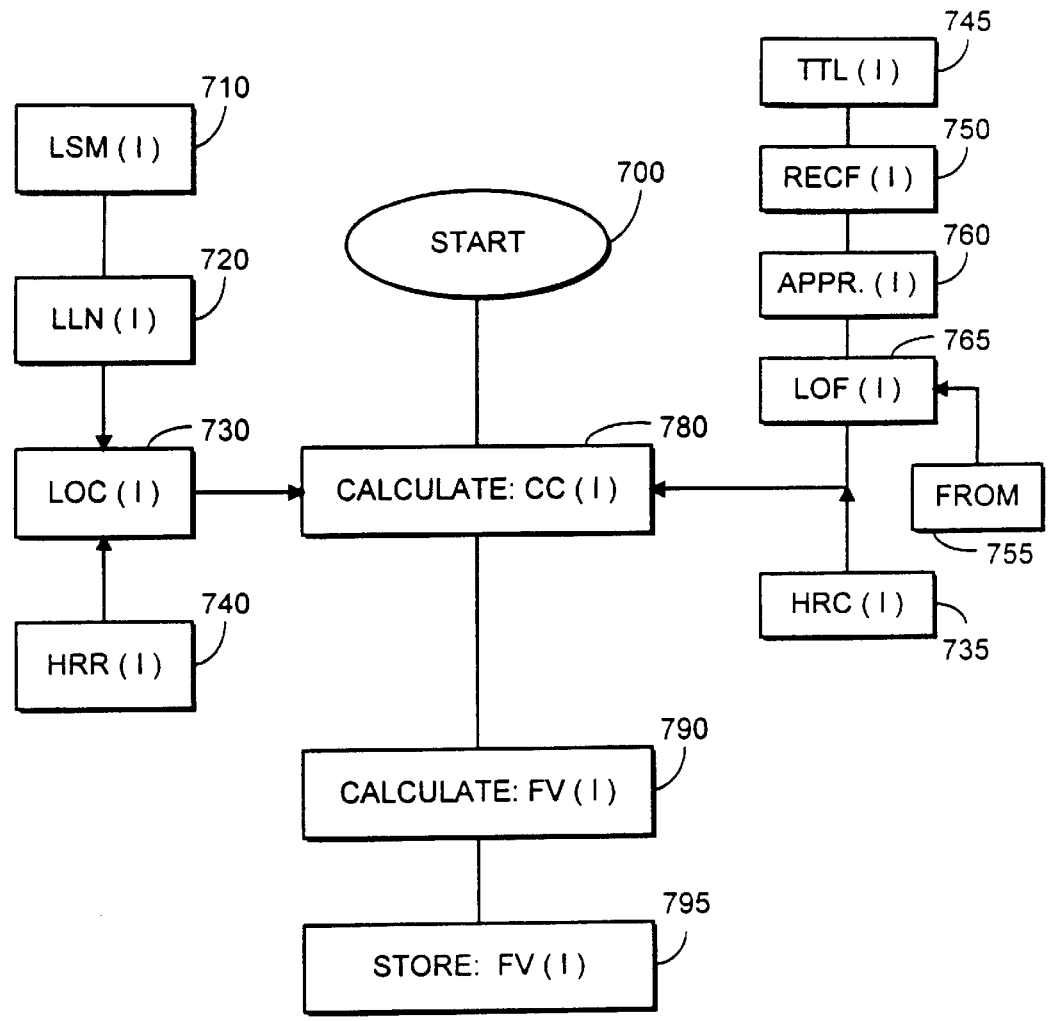
FIG. 7 provides a supplemental flow chart for the closing subsystem.

Turning now to FIG. 6, system logic is depicted that results in the determination of the Future Value of the closing costs FV (I) as used above. Start block 700 is followed by the calculation of the closing costs CC (I)—based on the select inputs of any initial lump sum loan LSM (I) block 710, Liens on the property LLN (I), block 720, Line of Credit LOC (I) block 730 and Home Repair Reserve HRR (I); these are summed and combined at block 770 with the inputs depicted on the right hand portion of FIG. 6. These include the title insurance TTL (I) block 745, recording fees RecF (I) block 750, the appraisal costs Appr (I), block 760 and loan origination fees LOF (I), block 765 using as input the appraised value of the property, block 755; and finally the home repair costs HRC (I) block 735.

The total closing costs are defined as the sum of 1) title insurance costs; 2) recordation and escrow fees; 3) Home Repair Costs—home repair costs for work to be completed immediately after loan closing and the extent of which was determined by a termite inspection and contractor as part of the loan origination process; and 4) appraisal fees all of which are manually determined and input into the system; plus 5) the loan processing fee which is calculated by multiplying the previously determined Lendable Future Value of the Property by 0.015. The sum of these four costs total the Closing Costs to be paid by the borrower from the proceeds of the reverse mortgage.

The system is responsible for determining the Deferral Start Date (DSD (I)) and calculating the Number of Periods between the Start Date of the Loan (LDS (I)) and the Deferral Date (DD (I)). This process is delineated in FIG. 6 beginning with start block 640 and block 645 with the input of the base amount BA (I). During the first pass through the system, the Deferral Start Date is set as equal to the average life expectancy of the applicant based on age—as taken from Interpolated Average Life Expectancy Tables, block 675. Once the Deferral Start Date is determined, the system calculates the number of periods NPD (I), from the Start Date of the Loan until the Deferral Start Date, block 660. This value is stored at block 670 and used in subsequent iterations. As part of the optimization aspect of this program, the system will recompute the Monthly Payment six more times by recalculating the Number of Periods Until the Deferred Annuity Payments Begin. The system selects three start dates on either side of the average life expectancy in order to recompute the Number of Periods Until the Deferral Period Begins. This is described in more detail later in this document.

From the Lendable Future Value of the Property, the Future Value, computed at the note rate, of all annuity costs, closing costs, line of credit and/or lump sum payments and/or VISA credit limits, home repair costs as determined by termite inspection, any home repair reserve, and any prior liens against the property are subtracted. A more detailed discussion of the determination of the above-mentioned costs or amounts follows below.

The line of credit option is available to the borrower who elects to take less than the maximum amount of payment available in the form of monthly reverse mortgage payments because he/she does not want or need monthly income. To the extent that the borrower has a line of credit amount available and does not use it, the actual amount of the line of credit increases over time at a contractually fixed interest rate until the annuity date. This amount is calculated by the system as more fully described below.

Once determination of the line of credit amount is calculated, it can be offered to the borrower in one of these forms: 1) as an open end line of credit (that is, the credit limit can be drawn down, repaid and redrawn down as often as desired); 2) a closed end line of credit that can be drawn down at any time and does not need to be repaid until repayment of the reverse mortgage; 3) a single lump sum payment equal to or less than the line of credit amount; or 4) a larger monthly reverse mortgage payment amount. The borrower may also select some combination of the above four forms as long as the total amount does not exceed the line of credit maximum amount.

Referring to FIG. 8, the system logic for determining the line of credit is depicted. Following start block 800, logic continues to block 810 where the desired monthly payment XMP (I) is loaded and used at block 850 to determine the Future Value of Mortgage Amount (FVMA (I)); other inputs used in this calculation include: the interest rate on the reverse mortgage (INT (I)) at block 820; the Number of Periods until the Deferred Annuity Payments Begin (NPD (I)) at block 830; and the Initial Closing Costs (CC (I)) at block 840. With these inputs, the Future Value of Mortgage Amount (FVMA (I)) can be calculated. Over time the Number of Periods Until the Deferred Annuity Payments Begins, decreases, which in turn increases the Future Value of the Line of Credit. This means that as time goes on, the amount of the line of credit available increases, if the borrower has not previously used the line of credit. This determination is made at block 860.

The Present Value of the Line of Credit is determined (LOC (I)) at block 870 using time value of money and inputs of the Future Value of the Line of Credit, the Number of Periods Until the Annuity Date (block 873), and the Interest Rate on the reverse mortgage (block 875). After the present value calculation is done, the Present Value of the Line of Credit is compared with the LOCmax value—for example, greater than 10% to 50% of the Current Appraised Value (APP (I) ). Test 880 limits the present value of the line of credit to 10% to 50% of the current Appraised Value (APP (I) ) via loop blocks 890 and 900. Specifically, if the answer to test 880 is yes, the amount of desired line of credit must be reduced, and the system loops until the answer is no. If the amount is less than 10% to 50%,—a "NO" to test 880—then the only remaining choice is the form in which the borrower wishes to utilize the available line of credit (LOC). The choice of LOC form is made at test 910 and includes Lump Sum distribution, 920, a pure LOC, 930, a visa card (or similar), 940, fixed monthly payment, 950, or a combination of the above choices 960. Regardless of which form the borrower elects, the total amount of all forms shall not exceed the total Present Value of the Line of Credit.

Alternatively, the borrower specifies a present value amount of the line of credit at loan origination. Under this alternative the present value of the Line of Credit is input and computations proceed. This input amount may not exceed 10% to 50% of the Lendable Future Value of the Property.

Figure 9:
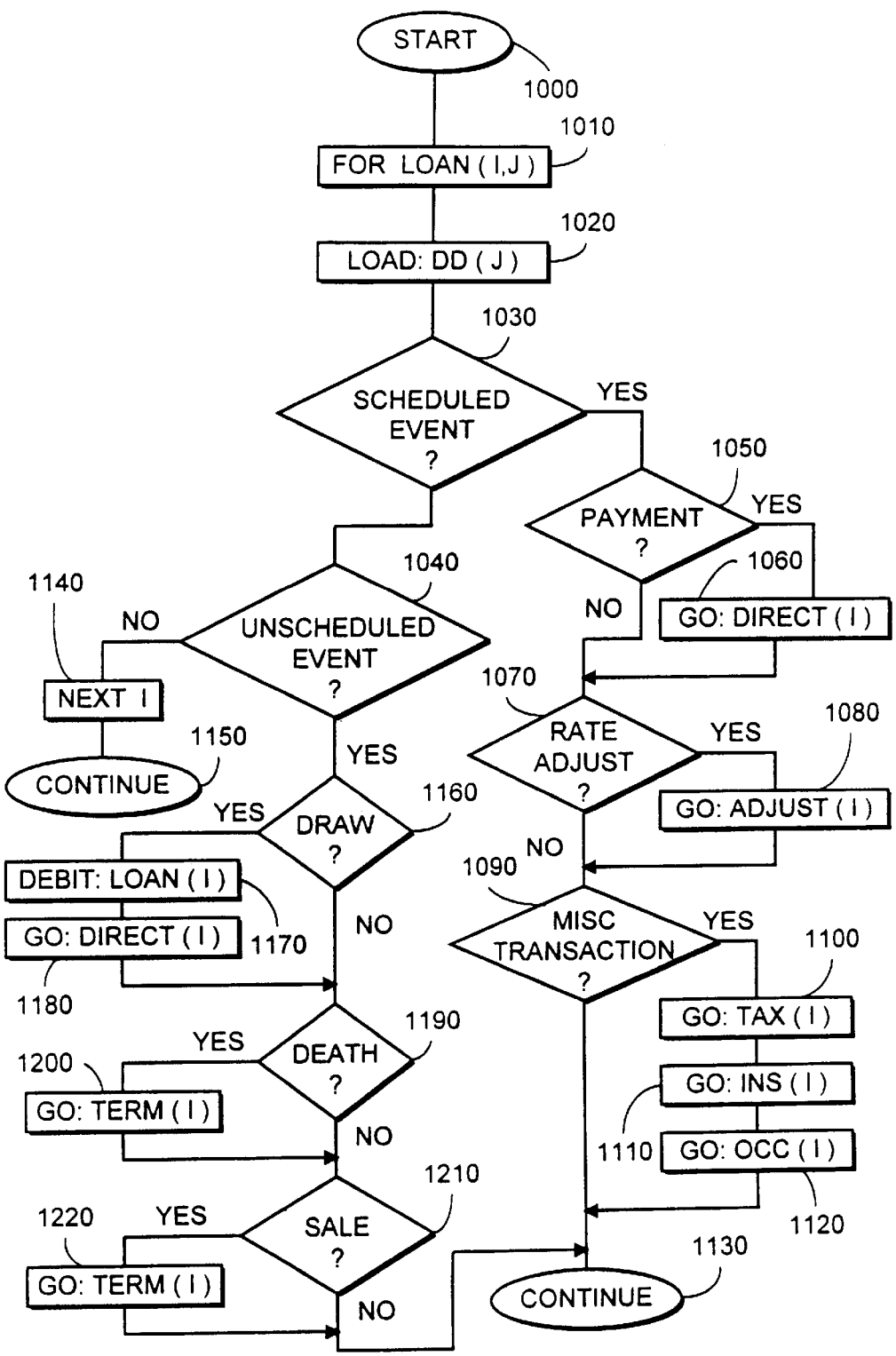
FIG. 9 provides a flow chart of the loan servicing subsystem.
Figure 10:
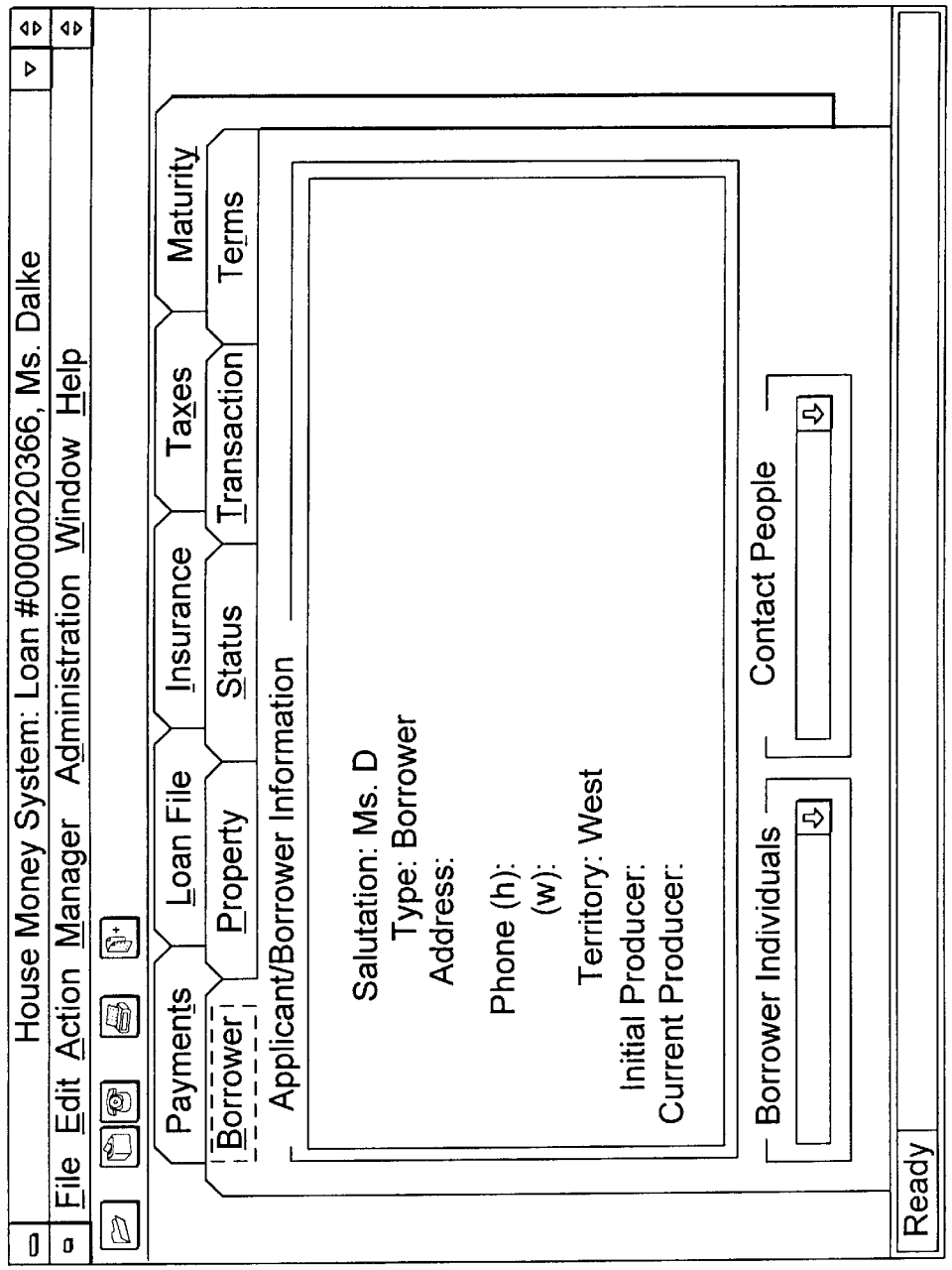
Figure 11:
Figure 16:

As presented in the above pricing model, there are many options that if selected require precise monitoring and overall system tracking to insure adequate loan performance. In particular, the loan implicates a long term relationship between the system proprietor and the numerous clients—involving many periodic and unscheduled transactions. The foregoing is handled by the system logic in a continuous manner. The loan servicing aspect of this operation is delineated in part in FIG. 9.

Beginning with start block 1000, logic continues to loop control block 1010, setting the account variables for the loan no. (I) and the date (or period control variable) (J). At block 1020, the system loads loan database DD (J) for the current Jth period. At test 1030, the system tests the first batch (Ith) for scheduled events that need attendance. If the response to the test is positive, logic branches to test 1050 and the system walks through the scheduled events beginning with the Payment test—i.e., the ascertainment of whether this period involves payment to the loan holder and the amount thereof. If so, logic branches to block 1060 and the payment is implemented at the specified amount—either by direct deposit or other means. In a similar fashion, if the current period—J—is associated with a rate adjustment for the Ith loan holder, the system registers this at test 1070 and the loan attributes are modified via block 1080. Finally, in this illustrative example, the system tests for miscellaneous transactions at test 1090, with branches to blocks 1100 (taxes), block 1110 (insurance) and block 1120 (occupancy check)—these being typical of the many types of periodic and scheduled events utilized in maintaining the loan portfolio.

A "NO" to test 1030 branches logic to test 1040 and the determination of the existence of unscheduled events. If no unscheduled events reside in DD (I,J), system proceeds to the next I account, blocks 1140 and 1150. However, if unscheduled events have been entered into the database, the system takes these into account via the sequence of tests delineated in FIG. 9. Specifically, the system tests for unscheduled drawing of money from a revolving line of credit, test 1160, the death of the loan holder, test 1190 or the sale of the under-lying property, test 1210. Accordingly, the system loops through all the accounts updating the records to insure proper response to the loan commitments. The linked actions are either done automatically (debiting an account balance) or manually (termination of contract and collection on property value at sale). This iterative process continues for each entry in the database.

The foregoing examples have shown hierarchial—batch type processing; this formalization is used merely to enhance clarity of the presentation and it is expected that numerous programming regimens (for example, menu drives) may be employed to effect the fore-going objectives. In principle, non-batch processes are more efficient and may be exploited for these objectives by per se well known database techniques. This is further illustrated with the menu screen displays depicted in FIGS. 10 through 19. In general, these screen displays depict several views available in managing the account loan servicing process.

Turning to the screen displays in FIGS. 10–19, the system provides "views" of important database information for checking and/or modifying, via user input. Each screen includes ten "tabs" across the top, indicating ten separate views. Cursor selection of any tab accesses that view. Sample views are presented for each tab in FIGS. 10–19, which are otherwise largely self-explanatory.

The above-described arrangement is merely illustrative of the principles of the present invention. Numerous modifications and adaptations thereof will be readily apparent to those skilled in the art without departing from the spirit and scope of the present invention.

What is claimed is:

1. In combination in a system for commercial product and/or service support including processing one or more user defined illiquid assets having a measurable valuation and developing a combination of financial instruments corresponding to combined secured credit and deferred annuity, comprising:

means for collecting and inputting into a data processing system a set of application parameters associated with a request for access to reverse equity financing said application parameters include biographical data on an applicant and asset valuation data on one or more qualified assets forming a basis for securing of credit;

means for selectively accessing actuarial data taken from a database in communication with said system and/or calculated by a data processing means of said system, based on said application parameters;

means for inputting one or more system or user selected combinations of secured debt parameters and annuity parameters corresponding to a select level of incremental cash flow objectives;

means for interactive evaluation of said incremental cash flow and selection of an annuity and loan program structure corresponding to a selected cash flow;

data processing means in said system responsive to said input means and accessing means for calculating a credit allocation and insurance premium consistent with system defined credit lending parameters and selected cash flow, wherein said data processing means further provides a framework of periodic payments associated with a release of credit in the form of a reverse equity mortgage loan and a premium level for a deferred annuity wherein a deferral period for said deferred annuity is determined in part from biographical information, including information relating to life expectancy.

2. The system of claim 1 wherein said data processing means further comprises means for determining an initial deferral period for said deferred annuity based on said biographical data and stored life expectancy data.

3. The system of claim 2 wherein said forecasting data includes an appreciation rate for selected assets.

4. The system of claim 3 wherein said system iteratively calculates separate payment schedules pursuant to user selected preferences.

5. The system of claim 1 wherein applicant data is collected through the entry of field values in a form.

6. The system of claim 5 wherein said form reposes on a display and data is entered in said fields via key stroke entry.

7. In combination in a data processing system for commercial product and/or service support by processing of individual accounts corresponding to applicants for select credit wherein said system processes account data for the selective assessment of financial instruments including a reverse equity mortgage and a deferred annuity to provide a stream of cash flow for an indeterminate period of time secured by predefined assets, comprising:

first computer input means for selective entry of system and applicant account parameters corresponding to a credit application which is to be applied to an assessment of a current and future value associated with said pre-defined assets;

data processing means connected to said first computer and responsive to said inputted parameters for determining account processing and record keeping parameters based on a designated combination of reverse equity mortgage commitment and deferred annuity structure corresponding to the select cash flow requirements of said account applicant, actuarial data on said applicant and the valuation of said asset; and second computer means in communication with said first computer means for account processing and tracking actual events associated with said mortgage commitment and deferred annuity implementation including asset transactions and creating a report corresponding to account parameters.

8. The system of claim 7 further comprising a second data processing means for providing a line of credit associated with a segmented portion of said asset available to provide additional credit to the account applicant.

9. The system of claim 7 wherein said input means receives input parameters including an appraisal, an appreciation rate, loan start date, applicant actuarial assessment, and current interest rate.

10. The system of claim 7 wherein said data processing means provides a set of initial account attributes based on the life expectancy of the account applicant and permits reassessment of account attributes via interactive adjustment of select parameters including deferral period for said annuity.

11. A data processing system of the type for processing plural accounts having discrete and disparate attributes corresponding to an integrated reverse equity loan and annuity product, comprising:

account qualification means including interactive data collection to provide information for assessing prospect data and screening prospects to narrow a universe of applicants to a smaller segment of viable loan prospects;

loan structure means for receiving input including information on an applicant and an underlying asset and determining a suitable structure of distributed payment stream income, annuity deferral period based in part on biographical data of an applicant, line of credit and reserved equity for said applicant for a loan; and loan servicing means for monitoring a plurality of accounts for reverse equity financing and providing for one or more transactions associated with said accounts, including scheduled payments and unscheduled tracking of events.

12. The system of claim 11 further comprising means for utilizing demographic data to establish an approximation of the underlying asset valuation.

13. The system of claim 11 wherein said loan structure means includes means for establishing a deferred single premium annuity tied to a termination date of said loan in accordance with loan recipient biographic data.

14. The system of claim 11 wherein said loan servicing means further provides for a line of credit and a periodic payment tied to an asset collateralizing said loan.

15. The system of claim 11 wherein said unscheduled events include death of the applicant and destruction of said underlying asset.

16. The system of claim 11 wherein said line of credit is financed by a reverse mortgage on said asset.

17. The system of claim 11 wherein said loan servicing means includes means for updating an account database with transactions.

18. The system of claim 11 wherein said prospect data is retained in a database for future referral.

19. The system of claim 11 wherein said screening process includes forecasting future appreciation of said asset.

20. The system of claim 11 further comprising means for collecting prospect data for account qualification.

* * * * *